Patented Apr. 22, 1930

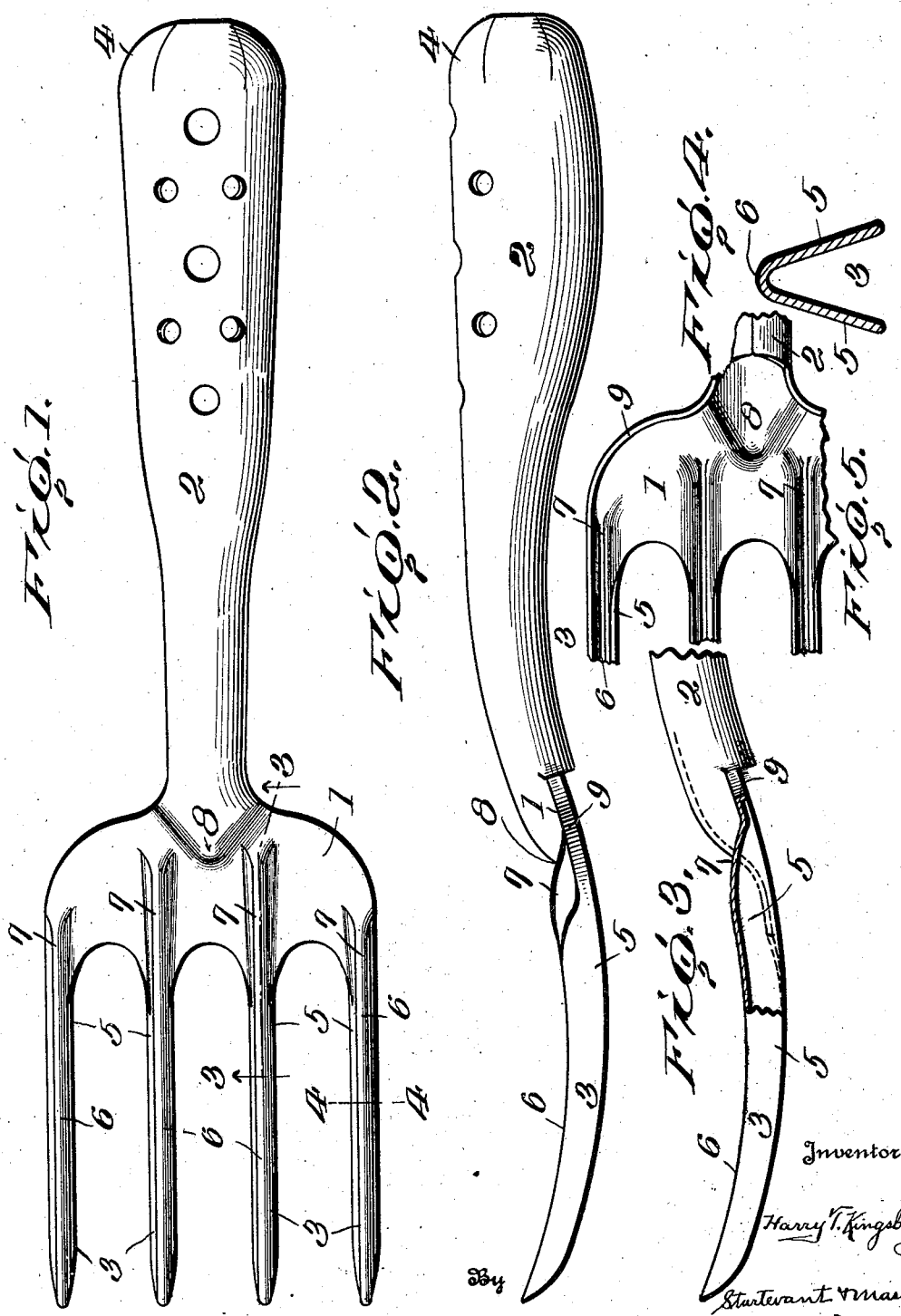

1,755,651

UNITED STATES PATENT OFFICE

HARRY T. KINGSBURY, OF KEENE, NEW HAMPSHIRE

HAND GARDEN FORK

Application filed December 8, 1928. Serial No. 324,697.

The invention relates to new and useful improvements in a hand garden fork which is made from sheet metal.

An object of the invention is to provide a simple, cheap, strong hand garden fork from a single blank of sheet metal wherein the tines are reinforced against lateral bending and the shank is likewise reinforced against bending at the juncture of the tines and handle therewith, and wherein all of said reinforcements are accomplished through the bending and shaping of the sheet metal.

In the drawings:—

Fig. 1 is a plan view of a hand garden fork embodying the invention.

Fig. 2 is a side view of the same.

Fig. 3 is a view partly in side elevation and partly in section on the line 3—3 of Fig. 1.

Fig. 4 is a section on the line 4—4 of Fig. 1.

Fig. 5 is a view of a portion of the fork from the under face thereof.

The invention is directed to a hand garden fork which is made from sheet metal by stamping and bending the same. The fork includes a shank, a handle, and tines, all of which are integral. The tines are shaped by bending the metal so as to be strengthened against lateral bending and the tines are caused to extend into the shank through a bending of the metal of the shank. This not only reinforces the shank but also the juncture between the tine and the shank. The handle is preferably bent so as to form a closed handle with an upper rounded end. The shank is further bent along its outer edge so as to provide a flange extending at right angles to the plane of the shank and this flange extends into the outer tines and into the handle so as to reinforce the shank against lateral bending and also reinforce the portion of the fork joining the shank and the handle.

Referring more in detail to the drawings, the invention is embodied in a hand garden fork which consists of a shank portion 1, a handle 2, and tines 3, 3, 3, 3. This garden tool is made from sheet metal. A blank is cut to proper shape and the blank is stamped into proper shape. The handle is preferably a closed handle with the upper end thereof rounded as indicated at 4 in the drawings. This handle construction is similar to that shown and described in connection with the hand trowel in the Harry T. Kingsbury Patent, 1,321,055, granted November 4, 1919.

Each tine is stamped so as to be substantially V-shaped in cross section, thus providing side walls 5, 5 which are connected by a rounded portion 6 which is the upper edge of the tine. The shank 1 is likewise bent in line with the tines so that a rib V-shaped in cross section is provided in alignment with each tine. These V-shaped ribs are indicated at 7, 7 in the drawing. The V-shaped ribs in line with the two central tines extend well into the shank and close to the line where the handle joins the same. The ribs 7, 7 in alignment with the outer tines also extend into the shank and in effect these ribs are part of the tines, and the tines may be said to extend into the shank. This shaping of the tines not only strengthens and reinforces the tines against any lateral bending, but the extending of the tines into the shank likewise reinforces the shank against any lateral bending, and particularly along the line where the tines join the shank.

The portion of the shank at the lower end of the handle is bent upwardly as indicated at 8 in the drawing and this greatly reinforces the connection between the handle and the shank. This reinforcement lies very close to the upper ends of the tines 7, 7. The shank along its outer edge is bent at right angles to the plane of the shank as indicated at 9 in the drawing. This flange 9 extends all the way around and into the handle and is integrally connected to the handle. The flange also extends into the outer wall of the outer tines so that the outer wall 5 of the outer tines is in line with and becomes a part of the flange.

From the above description it will be apparent that a hand garden fork has been provided which is very simple as it is a one-piece construction, and very cheap as it is made from a single blank of sheet metal, and very strong as all of the parts are reinforced by a shaping of the metal so as to prevent any bending of the parts through lateral strain thereon.

It is obvious that minor changes in the details of construction may be made without departing from the spirit of the invention as set forth in the appended claims.

Having fully described my invention, what I claim as new and desire to secure by Letters Patent, is:—

1. A sheet metal hand garden fork comprising a shank, a handle, and tines, all of which are formed integral with each other, the metal of the shank being bent so that the tines extend into the shank and reinforce the same, said shank being bent to provide a flange extending at an angle to the plane of the shank along its outer edge and extending into the handle and outer wall of the outer tines.

2. A sheet metal hand garden fork comprising a shank, a handle, and tines, all of which are formed integral with each other, said metal of the tines being bent V-shaped in cross section and said shank being similarly bent into alignment with the tines so that the tines extend into the shank, said shank being also bent so as to provide a flange extending at an angle to the plane of the shank along the outer edge of the shank and extending into the handle and into the outer wall of the outer tines.

In testimony whereof, I affix my signature.

HARRY T. KINGSBURY.